United States Patent
Brown

(10) Patent No.: US 8,832,445 B2
(45) Date of Patent: Sep. 9, 2014

(54) SYSTEM AND METHOD FOR HANDLING SECURE MESSAGES

(75) Inventor: Michael S. Brown, Waterloo (CA)

(73) Assignee: BlackBerry Limited (CA)

(*) Notice: Subject to any disclaimer, the term of this patent is extended or adjusted under 35 U.S.C. 154(b) by 1358 days.

(21) Appl. No.: 11/065,958

(22) Filed: Feb. 25, 2005

(65) Prior Publication Data

US 2005/0246540 A1  Nov. 3, 2005

Related U.S. Application Data

(60) Provisional application No. 60/566,773, filed on Apr. 30, 2004.

(51) Int. Cl.
```
H04L 9/14     (2006.01)
H04L 29/06    (2006.01)
H04M 1/725    (2006.01)
H04L 12/58    (2006.01)
```
(52) U.S. Cl.
CPC .......... *H04L 63/0428* (2013.01); *H04L 63/105* (2013.01); *H04L 12/5895* (2013.01); *H04M 1/72552* (2013.01)
USPC .......... 713/176; 713/150; 713/151; 713/168; 380/247; 380/270; 715/233; 715/765

(58) Field of Classification Search
USPC .......... 713/150–151, 168, 176; 726/2, 26–27; 380/247, 270; 715/233, 765
See application file for complete search history.

(56) References Cited

U.S. PATENT DOCUMENTS

| | | | | |
|---|---|---|---|---|
| 5,497,422 A * | 3/1996 | Tysen et al. | .................. | 713/157 |
| 5,956,034 A * | 9/1999 | Sachs et al. | .................. | 715/776 |
| 6,324,500 B1 * | 11/2001 | Amro et al. | ...................... | 704/8 |
| 6,356,937 B1 * | 3/2002 | Montville et al. | ........... | 709/206 |
| 6,590,588 B2 * | 7/2003 | Lincke et al. | .................. | 715/744 |
| 6,598,161 B1 * | 7/2003 | Kluttz et al. | ................. | 713/166 |
| 6,636,965 B1 * | 10/2003 | Beyda et al. | ................. | 713/152 |
| 6,700,591 B1 * | 3/2004 | Sharpe | ......................... | 715/762 |
| 6,732,101 B1 * | 5/2004 | Cook | .............................. | 707/10 |
| 6,760,752 B1 * | 7/2004 | Liu et al. | ........................ | 709/206 |
| 6,931,532 B1 * | 8/2005 | Davis et al. | .................. | 713/167 |
| 6,963,971 B1 * | 11/2005 | Bush et al. | .................... | 713/153 |
| 6,993,574 B2 * | 1/2006 | Hall | ............................. | 709/219 |

(Continued)

FOREIGN PATENT DOCUMENTS

| | | | |
|---|---|---|---|
| CA | 2374189 | * | 9/2003 |
| EP | 1265182 A | | 11/2002 |

(Continued)

OTHER PUBLICATIONS

E-Mail Security with PGP and PEM: How to Keep Your Electronic Mail Private, Bruce Schneier, Wiley Publishing 1995—26 pgs.

(Continued)

*Primary Examiner* — Yin-Chen Shaw
(74) *Attorney, Agent, or Firm* — Schwegman Lundberg & Woessner, P.A.

(57) ABSTRACT

Systems and methods are provided for handling electronic messages. An electronic message is examined as to whether the message contains one or more encoding properties. A visual indication is generated for use in a display to a user wherein the visual indication is displayed to the extent to which the encoding property applies to a displayed portion of the message.

29 Claims, 12 Drawing Sheets

(56) References Cited

U.S. PATENT DOCUMENTS

| | | | |
|---|---|---|---|
| 7,228,433 B2* | 6/2007 | Turner et al. | 713/182 |
| 7,299,359 B2* | 11/2007 | Hurley | 713/182 |
| 7,346,769 B2* | 3/2008 | Forlenza et al. | 713/151 |
| 7,484,107 B2* | 1/2009 | Forlenza et al. | 713/193 |
| 8,261,184 B2* | 9/2012 | Haase | 715/232 |
| 2002/0169954 A1* | 11/2002 | Bandini et al. | 713/153 |
| 2004/0136533 A1* | 7/2004 | Takagaki et al. | 380/255 |
| 2004/0168055 A1* | 8/2004 | Lord et al. | 713/156 |
| 2004/0246523 A1* | 12/2004 | Moriwaki | 358/1.15 |
| 2005/0071632 A1* | 3/2005 | Pauker et al. | 713/165 |
| 2005/0188312 A1* | 8/2005 | Bocking et al. | 715/739 |
| 2005/0246526 A1* | 11/2005 | Forlenza et al. | 713/165 |

FOREIGN PATENT DOCUMENTS

| | | |
|---|---|---|
| EP | 1265182 A2 | 12/2002 |
| WO | 03/075530 A1 | 9/2003 |
| WO | 03075530 | 9/2003 |
| WO | WO-03075530 | 9/2003 |
| WO | WO-03075530 A1 | 9/2003 |
| WO | WO-2005107177 A1 | 11/2005 |

OTHER PUBLICATIONS

MIME Security with Pretty Good Privacy: RFC 2015, Michael Elkins, Oct. 1996—8 pgs.
International Search Report of Application No. PCT/CA2005/000295, date of mailing Jun. 27, 2005—11 pgs.
Netscapetut Bodytext, pp. 1-4, Aug. 19, 2000, XP-002283474.
PGP Freeware for Windows 95, Windows 98, Windows NT, Windows 2000 & Windows Millennium, User's Guide, Version 7.0, pp. 1-246, Jan. 2001, XP-002286313.
Supplementary European Search Report, Issued Apr. 16, 2007, Application No. 05714537.7.
European Search and Examination Report. Application No. 07114623.7. Dated Feb. 28, 2008.
"Chinese Application Serial No. 200580013729.1, Office Action mailed Jan. 19, 2011", with English translation, 12 pgs.
"European ApplicationSerial No. 05714537.7, Office Action mailed Feb. 8, 2011", 5 pgs.
"International Application Serial No. PCT/CA2005/000295, International Search Report mailed Jun. 27, 2005", 1 pg.
"International Application Serial No. PCT/CA2005/000295, Written Opinion issued Nov. 1, 2006", 7 pgs.
Ramsdell, B., "S/MIME Version 3.1 Messsage Specification", draft-ietf-smimerfc2633bis-08.txt, (2004), 26 pgs.
"European Application Serial No. 05714537.7, Office Action mailed Mar. 15, 2010", 3 pgs.
"European Application Serial No. 05714537.7, Response filed Sep. 15, 2010 to Office Action mailed Mar. 15, 2010", 16 pgs.
"European Application Serial No. 05714537.7, Supplemental European Search Report mailed May 3, 2007", 4 pgs.
"Chinese Application Serial No. 200580013729.1, Office Action mailed Sep. 29, 2011", (w/ English Translation), 7 pgs.
"Chinese Application Serial No. 200580013729.1, Response filed Apr. 6, 2011 to Office Action dated Jan. 19, 2011", (w/ English Translation of Amended Claims), 18 pgs.
"European Application Serial No. 05714537.7, Response filed Jun. 9, 2011 to of Action mailed Feb. 8, 2011", 23 pgs.
"Indian Application Serial No. 6097/DELNP/2006, Response flied Jun. 15, 2011 to Office Action palled Jun. 18, 2010", 6 pgs.
"Chinese Application Serial No. 200580013729.1, Response filed Dec. 12, 2011 to Office Action filed Sep. 29, 2011", (w/ English Translation of Claims); 12 pgs.

* cited by examiner

SYSTEM AND METHOD FOR HANDLING SECURE MESSAGES

CROSS-REFERENCE TO RELATED APPLICATION

This application claims priority to and the benefit of U.S. Provisional Application Ser. No. 60/566,773 (entitled "System And Method For Handling Secure Messages") filed on Apr. 30, 2004, of which the entire disclosure (including any and all figures) is incorporated herein by reference.

BACKGROUND

1. Technical Field

The present invention relates generally to the field of communications, and in particular to handling secure messages on mobile wireless communications devices.

2. Description of the Related Art

E-mail messages provided to a recipient can be encoded in a number of different ways. For example, in a Pretty Good Privacy (PGP) message, parts of the message may be signed, parts may be encrypted, and parts may be plaintext. Difficulty arises when a user cannot easily tell which parts of the message have which property assigned to them especially when scrolling through the message.

SUMMARY

In accordance with the teachings disclosed herein, systems and methods are provided for handling electronic messages. As an example of a system and method, an electronic message is examined as to whether the message contains one or more encoding properties. A visual indication is generated based upon the examined electronic message and is used when the message is displayed to a user. The visual indication is displayed on the user display to the extent that the encoding property applies to a displayed portion of the message.

As another example, an apparatus can include encoding determination instructions configured to determine whether a message contains an encoding property as well as visual indication generation instructions configured to generate a visual indication for use in a display to a user. The visual indication can be generated based upon an encoding property being associated with the message, and the visual indication can be displayed to the extent substantially that the encoding property applies to a displayed portion of the message.

As will be appreciated, the systems and methods disclosed herein are capable of other and different embodiments, and capable of modifications in various respects. Accordingly, the drawings and description set forth herein are to be regarded as illustrative in nature and not restrictive.

DETAILED DESCRIPTION OF THE DRAWINGS

Figure 1:
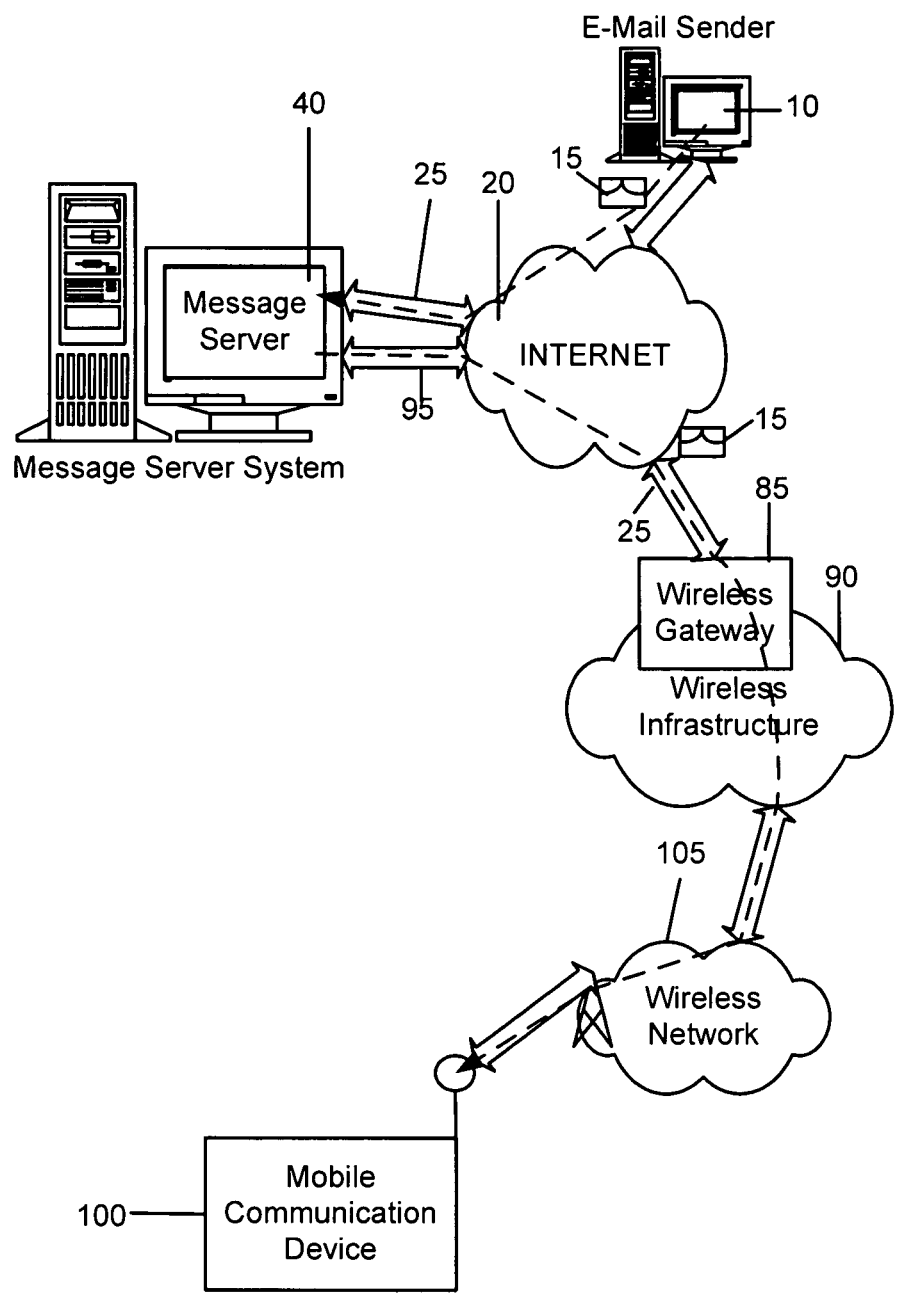
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or Ti connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex Radio Network and the DataTAC™ Radio Network. Examples of older voice-centric data networks include Personal Communication Systems (PCS) networks like GSM, and TDMA systems.

Figure 2:
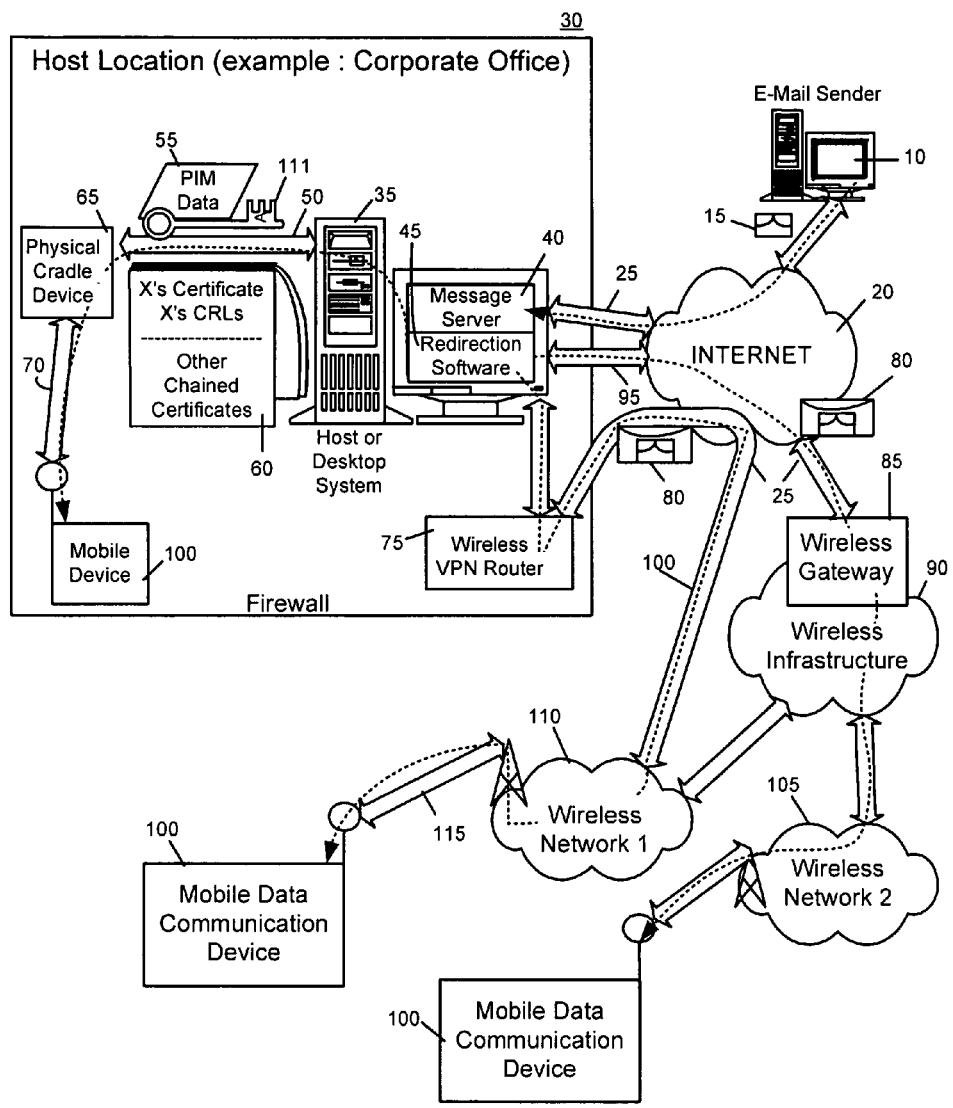
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001, which is hereby incorporated into this document by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
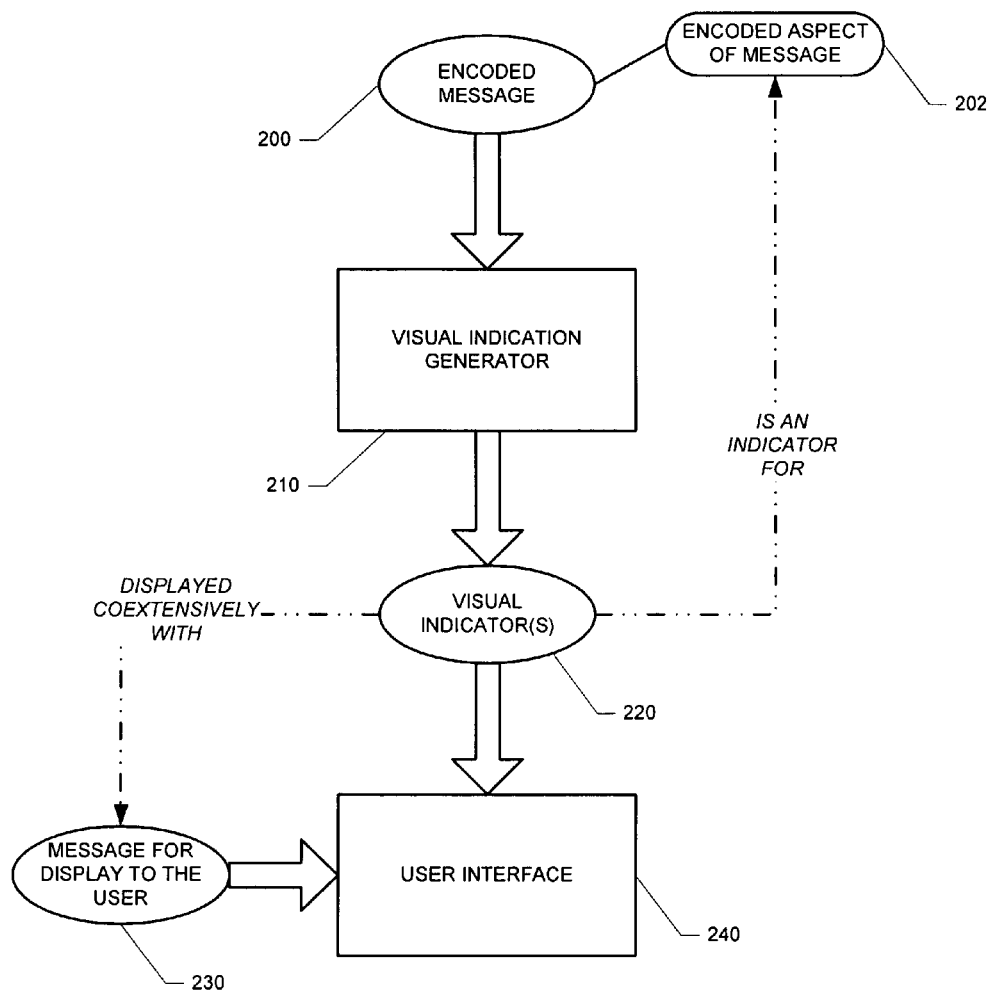
FIG. 3 is a block diagram depicting generation of visual indicators for display on a user interface.

FIG. 3 shows a system wherein information about an encoded message 200 is displayed on a user interface 240. A visual indication generator 210 generates one or more visual indicators 220 based upon whether the message 200 contains any encoding aspects or properties 202. A visual indicator 220 is displayed substantially coextensively with the message 230 to the user on the user interface 240 to the extent that the encoding property 202 applies to the portion of the message being displayed on the user interface 240. Accordingly, the extent visual indicator 220 is used to indicate the extent to which an encoding property applies to the text of the message.

Figure 4:
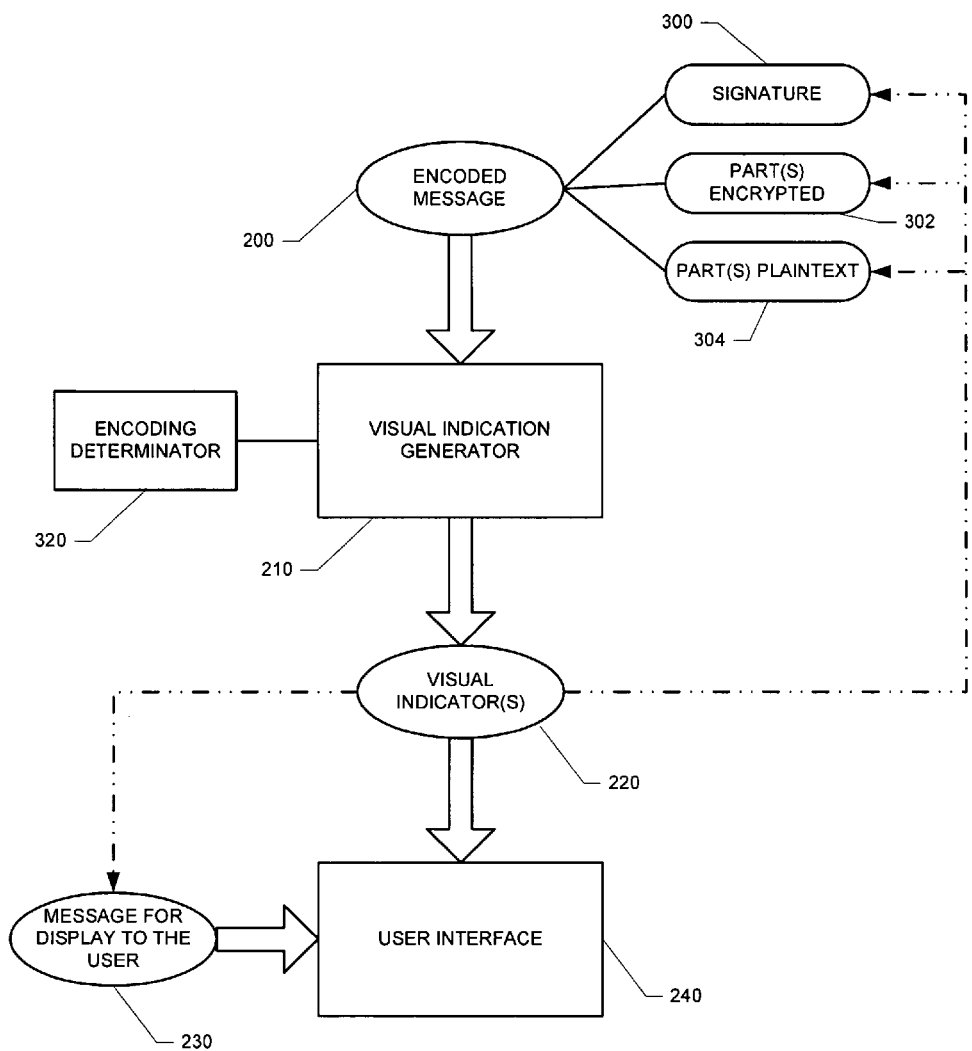
FIGS. 4 and 5 are block diagrams depicting different types of encoding that may be associated with an encoded message.

The one or more visual indicators 220 displayed on the user interface 240 can represent many different types of encoding that can be used with the message 200. FIG. 4 provides several illustrations of the types of the encoding that the visual indicators 220 can indicate. For example, a visual indicator 220 can indicate that an encoded message contains or does not contain a signature 300 as well as whether a signature has been validated. Additionally, a visual indicator 220 can indicate which part or parts (if any) of the message 200 have been encrypted 302. Similarly, a visual indicator 220 can indicate which part or parts (if any) of the message 200 contain plain text 304.

A visual indication generator 210 can access data provided by software module 320 to learn which parts of a message 200 contains encoding. The encoding determinator software module 320 can be a standalone module or part of a larger cryptographic software module (e.g., an encryption/decryption/digital signature verification module).

Figure 5:
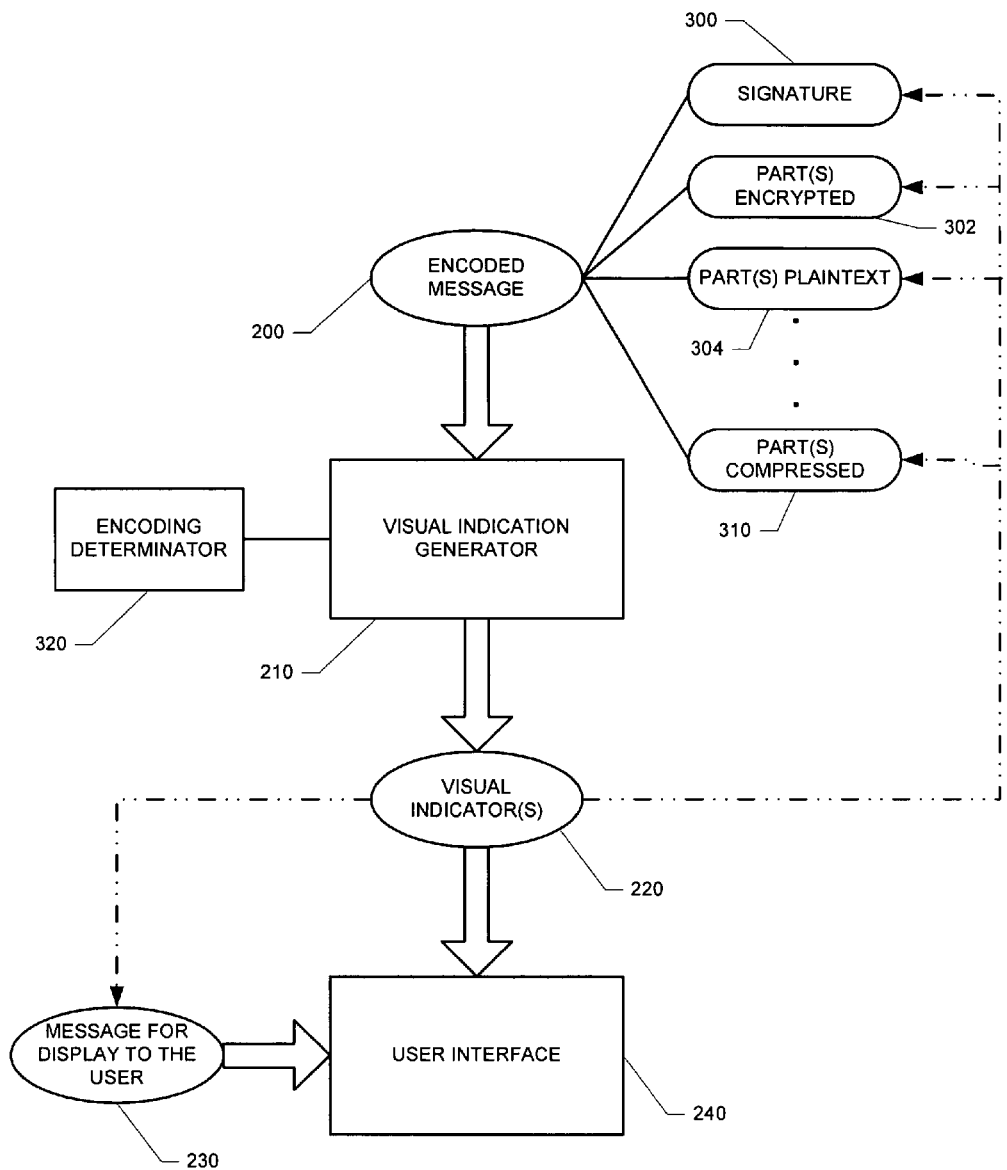

It should be understood that visual indicators 220 can represent additional encoding aspects of a message 200. FIG. 5 shows that visual indicators 220 can indicate which parts of a message 200 have been compressed 310.

Figure 6:
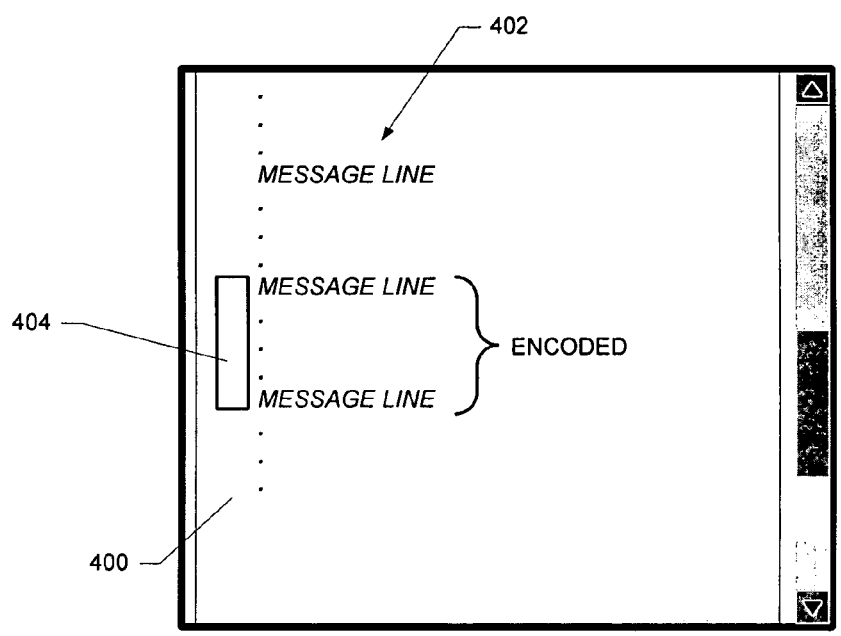
FIGS. 6 and 7 depict user interfaces containing visual indicators that are associated with encoded messages.

FIG. 6 shows a user interface 400 containing a visual indicator 404. The visual indicator 404 in this example is a vertical bar running along the length of the portion of the message text 402 for which an encoding property applies. It should be understood that other visual coextensive techniques may be utilized to indicate what encoding properties are associated with which parts of a message. As an illustration, different patterned backgrounds on a user interface could be used to indicate what encoding property is associated with which parts of a message.

Figure 7:
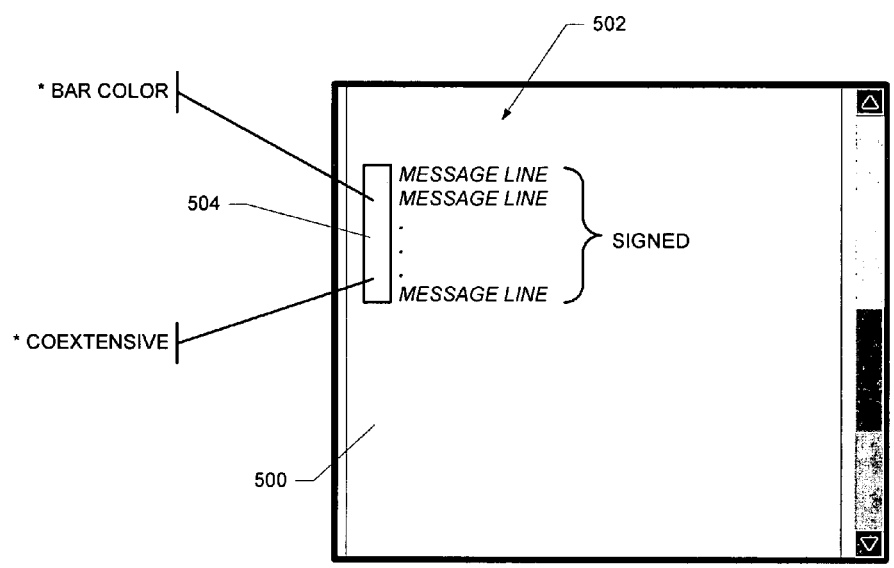

As another illustration, FIG. 7 shows a vertical bar indicator 504 on a user interface 500 that coextends along the length of the text 502 to indicate that the data is signed. In addition, on a color device, the bar 504 could be assigned different colors to indicate additional property values associated with the signature. For example, a green bar can be used to indicate the signature has been verified on the device, whereas a yellow bar could indicate that the device could not verify the message but the server which delivered the message to the device could verify the message. A red bar could indicate that the digital signature could not be verified (e.g., the message was tampered with).

A visual indicator could indicate other properties. For example, a bar could be used to indicate which part of the original text was encrypted, and the color could be used to show the strength of encryption (e.g., green for strong and yellow for weak).

As background on strength of encryption, messages encrypted according to secure messaging protocols such as Secure Multipurpose Internet Mail Extensions (S/MIME) or Pretty Good Privacy (PGP) among others can be encrypted using different ciphers. There are numerous ciphers available for this purpose, such as Triple Data Encryption Standard (Triple-DES), and Advanced Encryption Standard (AES), among others. Some ciphers are classified as "strong" ciphers, while others are classified as "weak" ciphers. Additionally, the perceived strength of a cipher may change over time, as new cryptanalytic attacks for the cipher are discovered.

When a user receives an encrypted message, the level of trust that the user can place on the confidentiality of the message depends on the strength of the cipher used for encryption. If a strong cipher is used, the user can be confident that the message was not read by someone other than the intended recipient. The weaker the cipher used, the less confident the user may be regarding the security of the communications channel. The following commonly-assigned patent document contains additional information regarding strength of encryption and is incorporated herein by reference: U.S. provisional application Ser. No. 60/494,623 (entitled "System and method of indicating the strength of encryption" filed Aug. 12, 2003). Coextensive visual indicators can be configured to indicate the strength of encryption.

A single bar could be used to indicate that one or more properties are applicable to a message as it is being displayed. For example, a single bar could be configured to indicate that the text of the message has been both digitally signed and encrypted. However, it should be understood that multiple bars can be utilized to indicate that multiple encoding properties are applicable to a message or a portion of a message. In this regards, a first bar indicates the extent to which a first encoding property is applicable to the text of a message, while a second bar can be used to indicate the extent to which a second encoding property is applicable to the text of the message. Because different encoding properties can be represented by the two bars, the bars may cover different portions of the same message. For example, a first bar may extend through the entire text of a message to indicate that the text has been digitally signed. However, a second bar may extend through only a portion of the text to indicate that only a portion of the message was encrypted. The two bars may assume different configurations when they are displayed on the user's interface provided that they are coextensive relative to the message parts to which they respectively pertain.

Figure 8:
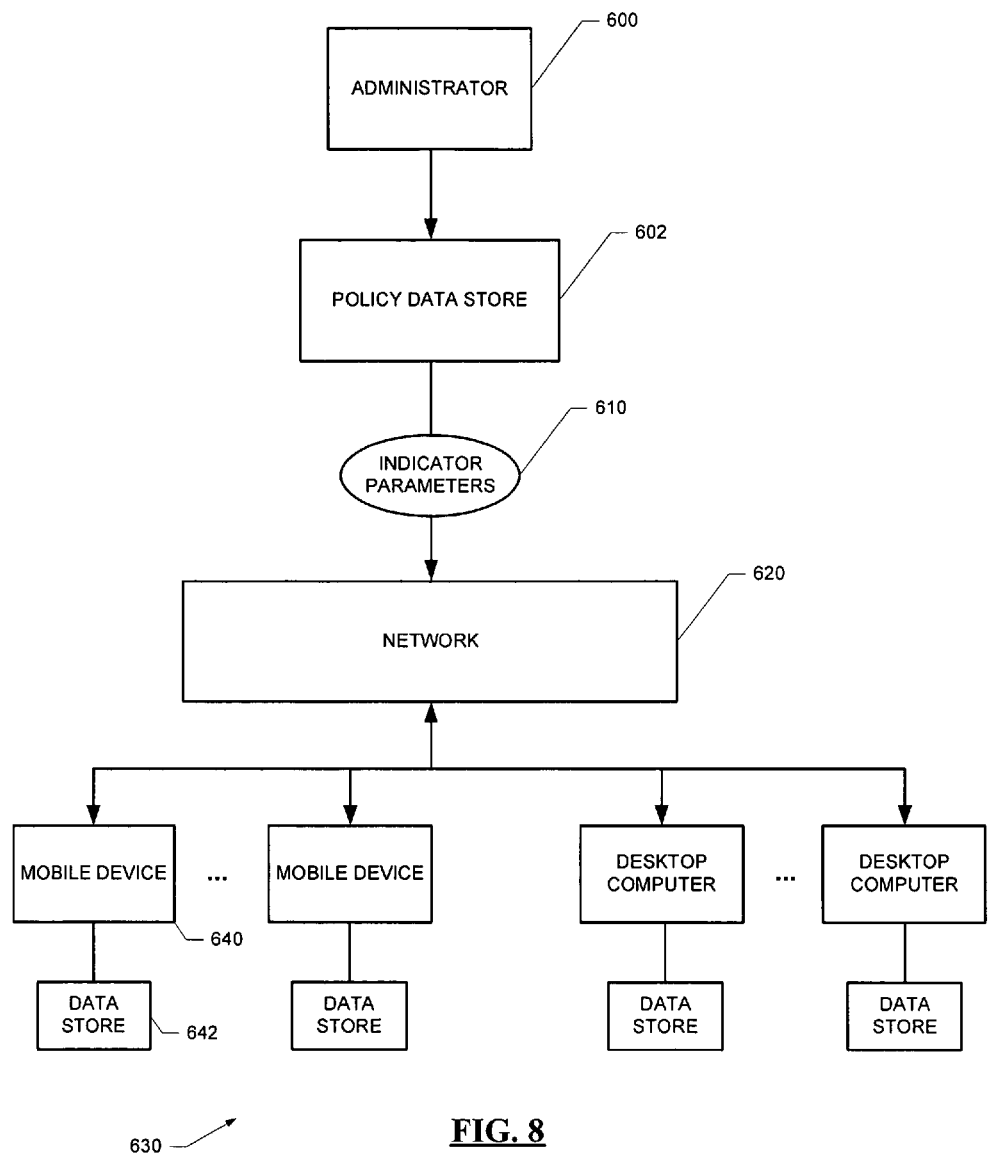
FIG. 8 is a block diagram depicting an IT administrator providing visual indicator settings to one or more devices.

FIG. 8 depicts that an IT (information technology) administrator 600 (or an agent thereof) can specify visual indicator settings 610 to one or more devices 630 (e.g., device 640).

The visual indicator settings 610 may be provided to the mobile device 640 over a network 620 (or other data connection mechanism) in order to update data stores on the devices 630 (e.g., data store 642 on mobile device 640). The mobile device 640 can be pre-programmed with the settings and then can be updated by the IT administrator 600 or can have the initial settings provided by the IT administrator 600.

This provides companies with, among other things, the capability to customize visual indication settings to suit their needs. Also, an IT administrator 600 can provide the same settings to all mobile devices of the company, thereby ensuring that company mobile devices adhere to a consistent IT policy.

An IT policy can be enforced upon mobile devices in many ways, such as through the approaches described in the following commonly assigned United States patent application which is hereby incorporated by reference: "System And Method Of Owner Control Of Electronic Devices" (Ser. No. 10/732,132 filed on Dec. 10, 2003). This document illustrates how a user of the mobile device can be prevented from altering or erasing owner control information (e.g., visual indication settings) specified by an IT administrator.

Figure 9:
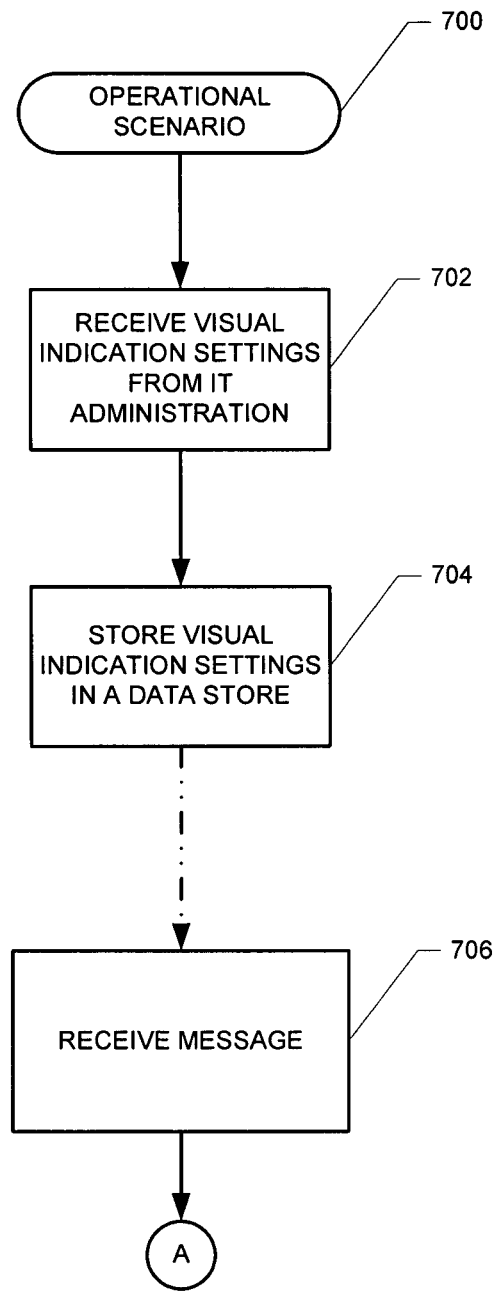
FIGS. 9 and 10 are flowcharts illustrating an operational scenario that involves generating visual indicators on an user interface of a mobile device.
Figure 10:
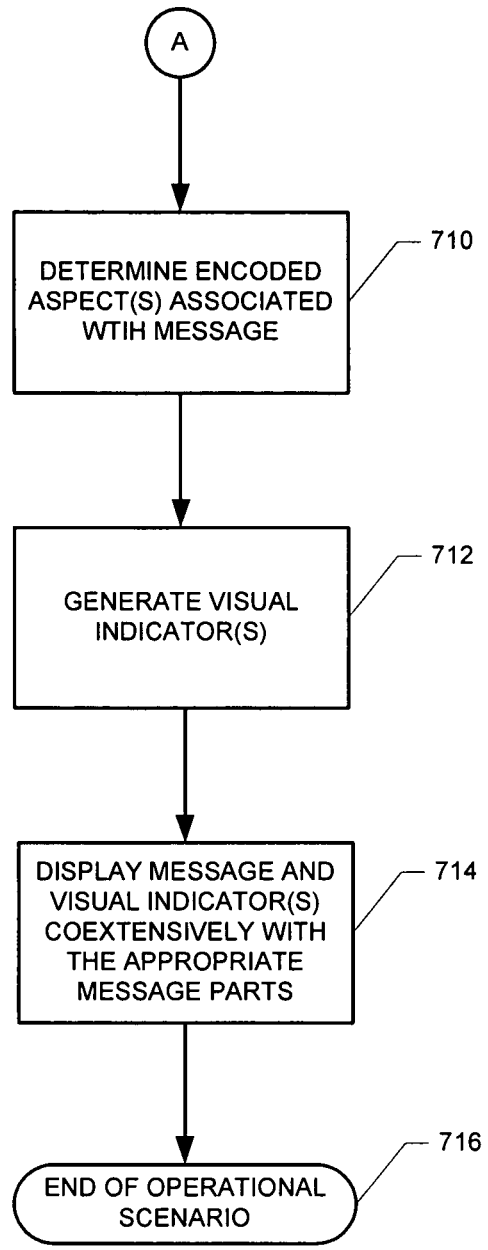

FIGS. 9 and 10 depict an operational scenario 700 for generating visual indicators on a user interface of a mobile device. In the operational scenario 700, visual indication settings are received at step 702 from personnel of an IT department. The mobile device stores at step 704 the visual indication settings in a data store located on the mobile device.

When the mobile device receives a message, such as an e-mail message at step 706, the encoding aspects associated with the message are determined at step 710. Based upon the visual indication settings received from the IT personnel, visual indicators are generated for the message at step 712. At step 714, the message and any visual indicators are displayed on a user interface. Processing for this operational scenario ends at end block 716.

It should be understood that similar to the other processing flows described herein, the steps and the order of the steps in the flowchart described herein may be altered, modified and/ or augmented and still achieve the desired outcome.

The systems and methods disclosed herein are presented only by way of example and are not meant to limit the scope of the invention. Other variations of the systems and methods described above will be apparent to those skilled in the art and as such are considered to be within the scope of the invention.

Figure 11:
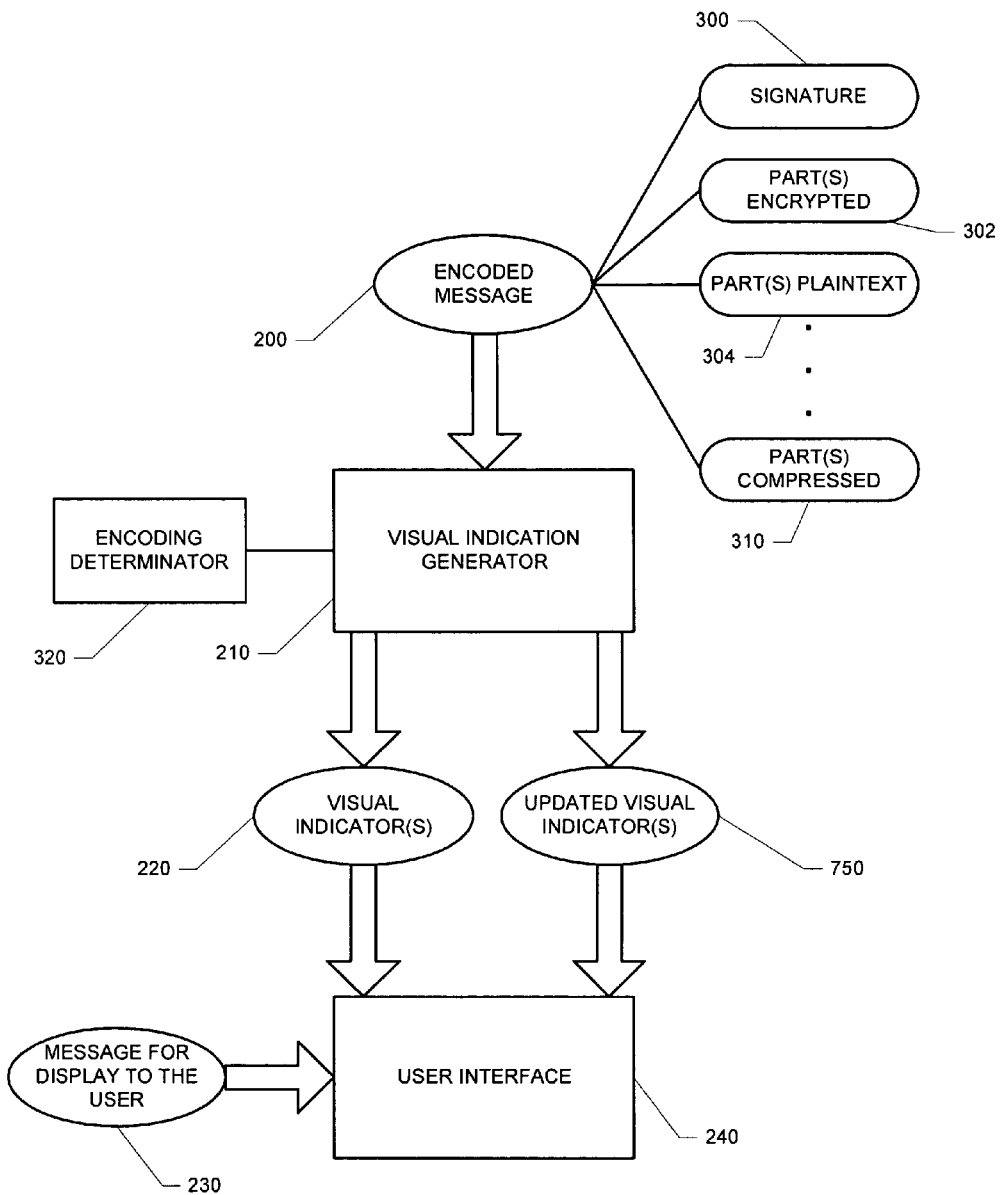
FIG. 11 is a block diagram depicting the updating of visual indicators on a user interface.

As an example of the wide scope of the systems and methods disclosed herein, FIG. 11 shows that visual indicator(s) 220 displayed on a user interface 240 can be updated as more information is learned about the encoding properties of a message 200. For example, an updated visual indicator 750 may be provided for display upon the user interface 240 as more of the message 200 is processed. This may happen when the signature 300 of the message 200 becomes verified or a certificate status becomes available.

Figure 12:
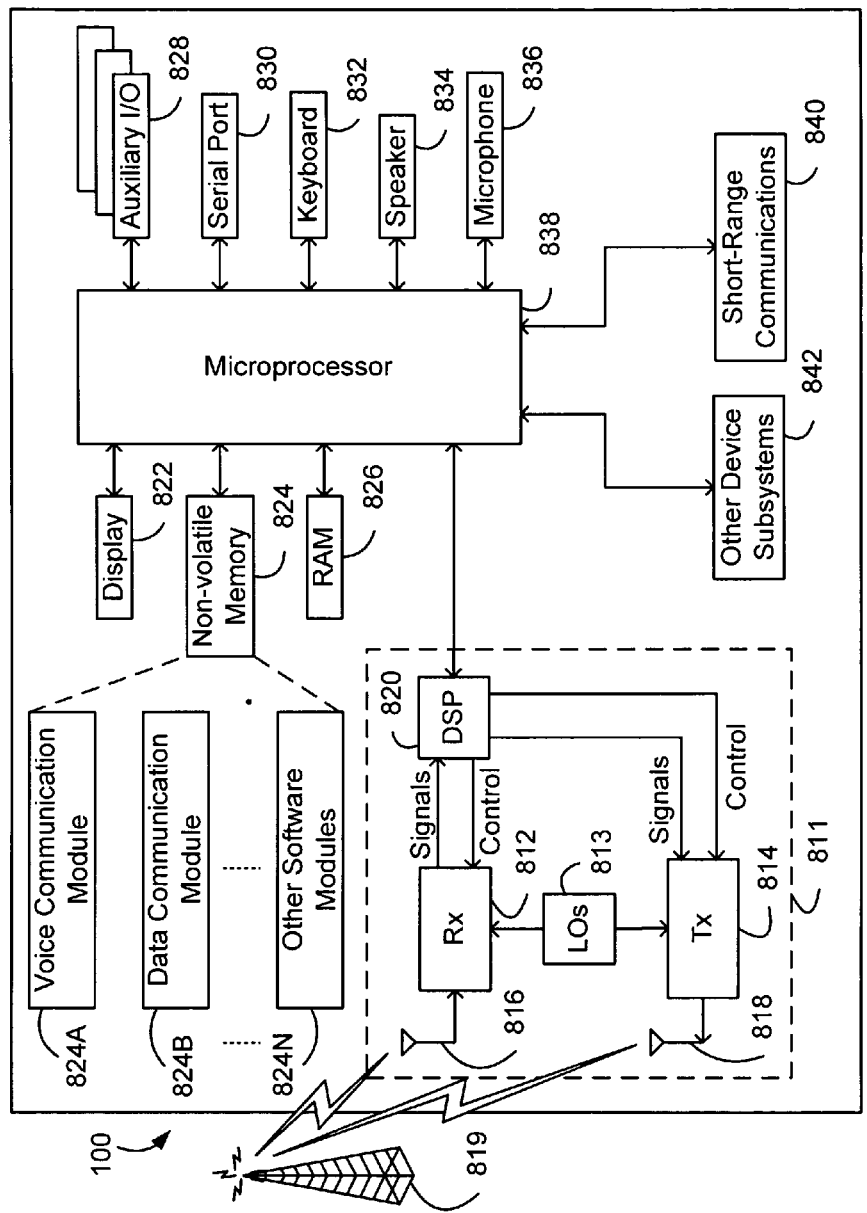
FIG. 12 is a block diagram of an example mobile.

As another example, the systems and methods disclosed herein may be used with many different computers and devices, such as a wireless mobile communications device shown in FIG. 12. With reference to FIG. 12, the mobile device 100 is a dual-mode mobile device and includes a transceiver 811, a microprocessor 838, a display 822, non-volatile memory 824, random access memory (RAM) 826, one or more auxiliary input/output (I/O) devices 828, a serial port 830, a keyboard 832, a speaker 834, a microphone 836, a short-range wireless communications sub-system 840, and other device sub-systems 842.

The transceiver 811 includes a receiver 812, a transmitter 814, antennas 816 and 818, one or more local oscillators 813, and a digital signal processor (DSP) 820. The antennas 816 and 818 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 12 by the communication tower 819. These voice and data networks may be separate communication networks using separate infrastructure, such as base stations, network controllers, etc., or they may be integrated into a single wireless network.

The transceiver 811 is used to communicate with the network 819, and includes the receiver 812, the transmitter 814, the one or more local oscillators 813 and the DSP 820. The DSP 820 is used to send and receive signals to and from the transceivers 816 and 818, and also provides control information to the receiver 812 and the transmitter 814. If the voice and data communications occur at a single frequency, or closely-spaced sets of frequencies, then a single local oscillator 813 may be used in conjunction with the receiver 812 and the transmitter 814. Alternatively, if different frequencies are utilized for voice communications versus data communications for example, then a plurality of local oscillators 813 can be used to generate a plurality of frequencies corresponding to the voice and data networks 819. Information, which includes both voice and data information, is communicated to and from the transceiver 811 via a link between the DSP 820 and the microprocessor 838.

The detailed design of the transceiver 811, such as frequency band, component selection, power level, etc., will be dependent upon the communication network 819 in which the mobile device 100 is intended to operate. For example, a mobile device 100 intended to operate in a North American market may include a transceiver 811 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 819, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 819, other than any legally required operations, such as '911' emergency calling.

After any required network registration or activation procedures have been completed, the mobile device 100 may the send and receive communication signals, including both voice and data signals, over the networks 819. Signals received by the antenna 816 from the communication network 819 are routed to the receiver 812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 820. In a similar manner, signals to be transmitted to the network 819 are processed, including modulation and encoding, for example, by the DSP 820 and are then provided to the transmitter 814 for digital to analog conversion, frequency up conversion, filtering, amplification and transmission to the communication network 819 via the antenna 818.

In addition to processing the communication signals, the DSP 820 also provides for transceiver control. For example, the gain levels applied to communication signals in the receiver 812 and the transmitter 814 may be adaptively controlled through automatic gain control algorithms implemented in the DSP 820. Other transceiver control algorithms could also be implemented in the DSP 820 in order to provide more sophisticated control of the transceiver 811.

The microprocessor 838 preferably manages and controls the overall operation of the mobile device 100. Many types of microprocessors or microcontrollers could be used here, or, alternatively, a single DSP 820 could be used to carry out the functions of the microprocessor 838. Low-level communication functions, including at least data and voice communications, are performed through the DSP 820 in the transceiver 811. Other, high-level communication applications, such as a voice communication application 824A, and a data communication application 824B may be stored in the non-volatile memory 824 for execution by the microprocessor 838. For example, the voice communication module 824A may provide a high-level user interface operable to transmit and receive voice calls between the mobile device 100 and a plurality of other voice or dual-mode devices via the network 819. Similarly, the data communication module 824B may provide a high-level user interface operable for sending and receiving data, such as e-mail messages, files, organizer information, short text messages, etc., between the mobile device 100 and a plurality of other data devices via the networks 819.

The microprocessor 838 also interacts with other device subsystems, such as the display 822, the RAM 826, the auxiliary input/output (I/O) subsystems 828, the serial port 830, the keyboard 832, the speaker 834, the microphone 836, the short-range communications subsystem 840 and any other device subsystems generally designated as 842.

Some of the subsystems shown in FIG. 12 perform communication-related functions, whereas other subsystems may provide "resident" or on-device functions. Notably, some subsystems, such as the keyboard 832 and the display 822 may be used for both communication-related functions, such as entering a text message for transmission over a data communication network, and device-resident functions such as a calculator or task list or other PDA type functions.

Operating system software used by the microprocessor 838 is preferably stored in a persistent store such as non-volatile memory 824. The non-volatile memory 824 may be implemented, for example, as a Flash memory component, or as battery backed-up RAM. In addition to the operating system, which controls low-level functions of the mobile device 810, the non-volatile memory 824 includes a plurality of software modules 824A-824N that can be executed by the microprocessor 838 (and/or the DSP 820), including a voice communication module 824A, a data communication module 824B, and a plurality of other operational modules 824N for carrying out a plurality of other functions. These modules are executed by the microprocessor 838 and provide a high-level interface between a user and the mobile device 100. This interface typically includes a graphical component provided through the display 822, and an input/output component provided through the auxiliary I/O 828, keyboard 832, speaker 834, and microphone 836. The operating system, specific device applications or modules, or parts thereof, may be temporarily loaded into a volatile store, such as RAM 826 for faster operation. Moreover, received communication signals may also be temporarily stored to RAM 826, before permanently writing them to a file system located in a persistent store such as the Flash memory 824.

An exemplary application module 824N that may be loaded onto the mobile device 100 is a personal information manager (PIM) application providing PDA functionality, such as calendar events, appointments, and task items. This module 824N may also interact with the voice communication module 824A for managing phone calls, voice mails, etc., and may also interact with the data communication module for managing e-mail communications and other data transmissions. Alternatively, all of the functionality of the voice communication module 824A and the data communication module 824B may be integrated into the PIM module.

The non-volatile memory 824 preferably also provides a file system to facilitate storage of PIM data items on the device. The PIM application preferably includes the ability to send and receive data items, either by itself, or in conjunction with the voice and data communication modules 824A, 824B, via the wireless networks 819. The PIM data items are preferably seamlessly integrated, synchronized and updated, via the wireless networks 819, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 826. Such information may instead be stored in the non-volatile memory 824, for example, when storage intervals are relatively short, such that the information is removed from memory soon after it is stored. However, storage of this information in the RAM 826 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 830 of the mobile device 100 to the serial port of a computer system or device. The serial port 830 may also be used to enable a user to set preferences through an external device or software application, or to download other application modules 824N for installation. This wired download path may be used to load an encryption key onto the device, which is a more secure method than exchanging encryption information via the wireless network 819. Interfaces for other wired download paths may be provided in the mobile device 100, in addition to or instead of the serial port 830. For example, a USB port would provide an interface to a similarly equipped personal computer.

Additional application modules 824N may be loaded onto the mobile device 100 through the networks 819, through an auxiliary I/O subsystem 828, through the serial port 830, through the short-range communications subsystem 840, or through any other suitable subsystem 842, and installed by a user in the non-volatile memory 824 or RAM 826. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 811 and provided to the microprocessor 838, which preferably further processes the received signal in multiple stages as described above, for eventual output to the display 822, or, alternatively, to an auxiliary I/O device 828. A user of mobile device 100 may also compose data items, such as e-mail messages, using the keyboard 832, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 828, which may include a thumbwheel input device, a touchpad, a variety of switches, a rocker input switch, etc. The composed data items input by the user may then be transmitted over the communication networks 819 via the transceiver module 811.

When the mobile device 100 is operating in a voice communication mode, the overall operation of the mobile device is substantially similar to the data mode, except that received signals are preferably be output to the speaker 834 and voice signals for transmission are generated by a microphone 836. Alternative voice or audio I/O subsystems, such as a voice message recording subsystem, may also be implemented on the mobile device 100. Although voice or audio signal output is preferably accomplished primarily through the speaker 834, the display 822 may also be used to provide an indication of the identity of a calling party, the duration of a voice call, or other voice call related information. For example, the microprocessor 838, in conjunction with the voice communication module and the operating system software, may detect the caller identification information of an incoming voice call and display it on the display 822.

A short-range communications subsystem 840 is also included in the mobile device 100. The subsystem 840 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or routine includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

What is claimed:

1. A method for handling electronic messages on a processor-based device, comprising:
    receiving an electronic message;
    determining whether one or more portions of the electronic message have one or more encoding properties applied thereto, the encoding properties including digital signature, compression, and encryption;
    generating, by the processor-based device without user intervention, a visual indication for each portion of the message for use in a display to indicate which of the one or more portions have the one or more of the encoding properties applied thereto;
    displaying the generated one or more visual indications,
    wherein for the one or more portions of the electronic message that have the one or more encoding properties applied thereto, the displaying comprises displaying one of the visual indications along with a decoded, readable content portion of the electronic message for each of the determined encoding properties, each of the visual indications indicating lines of the decoded, readable content portion to which one of the encoding properties applies, and indicative of which of the one or more encoding properties applies, each of the visual indications being separate from the decoded, readable content portion,
    wherein the method further includes refraining from displaying an unreadable encoded content portion when the decoded content portion having the one or more encoding properties applied thereto is displayed, and
    wherein when one of the encoding properties is the digital signature, one of the visual indications is further configured to indicate whether the digital signature has been validated and a relative strength of a cipher used for the digital signature.

2. The method of claim 1, wherein the visual indications are present on a user interface while the lines of the decoded, readable content portion are present on the user interface.

3. The method of claim 1, wherein at least one of the visual indications is configured to indicate which portion of the electronic message has been digitally signed.

4. The method of claim 1, wherein at least one of the visual indications is configured to indicate which portion of the electronic message has been encrypted.

5. The method of claim 1, further comprising identifying whether one or more portions of the electronic message do not have the one or more encoding properties applied thereto,
    wherein for the one or more portions of the electronic message that do not have the one or more encoding properties applied thereto, the displaying comprises displaying a visual indication to indicate the portions of the message do not have the one or more encoding properties applied thereto,
    wherein for the one or more portions of the electronic message that do not have the one or more encoding properties applied thereto, the visual indications are further configured to indicate the which portion of the electronic message is plaintext.

6. The method of claim 1, wherein at least one of the visual indications is configured to indicate which portion of the electronic message has been compressed.

7. The method of claim 1, wherein the visual indications are configured to indicate multiple encoding aspects associated with the electronic message.

8. The method of claim 1, wherein at least one of the visual indications comprises a vertical bar that indicates which portion of the electronic message has been signed, wherein a visual characteristic of the bar is configured to indicate whether a signature has been verified.

9. The method of claim 1, wherein at least one of the visual indications comprises a vertical bar that indicates which portion of the electronic message has been encrypted, wherein a visual characteristic of the bar is configured to indicate strength of the encryption.

10. The method of claim 1, wherein at least one of the visual indications comprises a vertical bar that indicates which portion of the electronic message is associated with one or more of the encoding properties.

11. The method of claim 1, wherein at least one of the visual indications comprises a patterned background that indicates which portion of the electronic message is associated with one or more of the encoding properties.

12. The method of claim 1, wherein multiple encoding properties apply to different portions of the electronic message;
wherein a plurality of the visual indications indicate which of the encoding properties apply to which portions of the electronic message.

13. The method of claim 12, wherein the visual indications extend through different portions of the electronic message.

14. The method of claim 1, wherein the visual indications are updated as more of the electronic message is processed.

15. The method of claim 1, wherein the visual indications are updated as additional security-related information about the electronic message is obtained.

16. The method of claim 15, wherein the additional information includes certificate status information.

17. The method of claim 1, wherein the processor-based device comprises a mobile device, wherein an information technology (IT) administrator provides settings to the mobile device in order to determine how the visual indications are to visually indicate one or more of the encoding properties.

18. The method of claim 1, wherein a data signal that is transmitted using a wireless network includes the electronic message;
wherein the data signal comprises packetized data that is transmitted through a carrier wave across the network.

19. The method of claim 1 wherein the method is performed by a wireless mobile communications device.

20. The method of claim 1 wherein the method is performed by a personal digital assistant (PDA) device.

21. A non-transitory computer-readable storage memory encoded with instructions for commanding a processor to handle electronic messages on a processor-based device, comprising:
encoding determination instructions configured to determine whether one or more portions of a message have one or more encoding properties applied thereto, the encoding properties including digital signature, compression, and encryption;
visual indication generation instructions configured to generate at least one of visual indications by the processor-based device without user intervention for use in a display to indicate which of the one or more portions have the one or more of the encoding properties applied thereto; and
displaying the generated visual indications,
wherein for the one or more portions of the electronic message that have the one or more encoding properties applied thereto, the displaying comprises displaying a one of the visual indications along with a decoded, readable content portion of the electronic message for each of the determined encoding properties, each of the visual indications indicating lines of the decoded, readable content portion to which one of the encoding properties applies, and indicative of which of the one or more encoding properties applies, each of the visual indications being separate from the decoded, readable content portion,
wherein the instructions further includes refraining from displaying an unreadable encoded content portion when the decoded content portion having the one or more encoding properties applied thereto is displayed, and
wherein when one of the encoding properties is the digital signature, one of the visual indications is further configured to indicate whether the digital signature has been validated and a relative strength of a cipher used for the digital signature.

22. A wireless mobile communications device having a hardware processor to configure the device to:
receive an electronic e-mail message;
receive data regarding whether one or more portions of the electronic e-mail message contains a one or more security-related properties, the security-related properties including digital signature, compression, and encryption;
generate, by the mobile communications device without user intervention, a visual indication for each portion of the message for use in a display to indicate which of the one or more portions have the one or more of the security-related properties applied thereto; and
display the generated visual indications,
wherein for the one or more portions of the electronic message that have the one or more security-related properties applied thereto, the displaying comprises displaying a one of the visual indications along with a decoded, readable content portion of the electronic e-mail message for each of the security-related properties, each of the visual indications indicating lines of the decoded, readable content portion to which one of the security-related properties applies, and indicative of which of the one or more security-related properties applies, each of the visual indications being separate from the decoded, readable content portion,
wherein the device is further configured to refrain from displaying an unreadable encoded content portion when the decoded content portion having the one or more security-related properties applied thereto is displayed, and
wherein when one of the security-related properties is the digital signature, one of the visual indications is further configured to indicate whether the digital signature has been validated and a relative strength of a cipher used for the digital signature.

23. The method of claim 1, wherein at least one of the visual indications comprises a vertical bar running alongside the decoded, readable content portion of the message to indicate which one of the encoding properties applies.

24. The method of claim 1, wherein more than one of the visual indications is displayed along with a portion of the body of the electronic message indicating that more than one of the encoding properties applies to the portion of the body of the electronic message, and wherein a second portion of the body of the electronic message is displayed without the visual indication when an encoding property does not apply to the second portion.

25. The method of claim 1 wherein when at least one of the visual indications indicates that the message includes a digital signature, the at least one of the visual indications is displayed to provide at least one of a plurality of visually distinct indications that indicate a status of the digital signature.

26. The method of claim 25 wherein when the at least one of the visual indications indicates the one or more encoding properties is encryption, the at least one of the visual indications is displayed to indicate a strength of the encryption.

27. The method of claim 26 wherein the plurality of visually distinct indications that indicate the status of the digital signature include one or more of:
- a visual indication to indicate that the electronic message has been signed by a digital signature;
- a visual indication to indicate when the digital signature has been verified by the device;
- a visual indication to indicate when the digital signature could not be verified or that the message was tampered with; and
- a visual indication to indicate when the digital signature is in the process of being verified.

28. The method of claim 27 wherein the at least one of the visual indications is updated with the status of the digital signature.

29. The method of claim 25 wherein the at least one of the visual indications the visual indication further indicates a relative strength of a cipher used for the encryption.

* * * * *

UNITED STATES PATENT AND TRADEMARK OFFICE
CERTIFICATE OF CORRECTION

PATENT NO. : 8,832,445 B2
APPLICATION NO. : 11/065958
DATED : September 9, 2014
INVENTOR(S) : Michael S. Brown It is certified that error appears in the above-identified patent and that said Letters Patent is hereby corrected as shown below:

In the Claims

In column 14, line 8, in Claim 21, after "displaying", delete "a", therefor

In column 14, line 31, in Claim 22, after "contains", delete "a", therefor

In column 14, line 44, in Claim 22, after "displaying", delete "a", therefor

Signed and Sealed this
Fifth Day of May, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 8,832,445 B2 | Page 1 of 1 |
| APPLICATION NO. | : 11/065958 | |
| DATED | : September 9, 2014 | |
| INVENTOR(S) | : Brown | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1483 days.

Signed and Sealed this
Eighth Day of September, 2015

Michelle K. Lee
*Director of the United States Patent and Trademark Office*